United States Patent
Teeter

[19]

[11] Patent Number: 6,131,834
[45] Date of Patent: Oct. 17, 2000

[54] SELF-PROPELLED IRRIGATION SYSTEM

[76] Inventor: Monty J. Teeter, P.O. Box 68, 106 N. Knox St., Johnson, Kans. 67855

[21] Appl. No.: 09/264,579

[22] Filed: Mar. 8, 1999

[51] Int. Cl.[7] ...................................................... B05B 3/00
[52] U.S. Cl. ........................................... 239/728; 184/6.12
[58] Field of Search .................................... 239/728, 735, 239/737; 222/608; 184/6, 6.12, 14, 65, 81

[56] References Cited

U.S. PATENT DOCUMENTS

| | | |
|---|---|---|
| 3,463,267 | 8/1969 | Dooley et al. . |
| 3,762,643 | 10/1973 | Allen, Jr. . |
| 4,133,344 | 1/1979 | Hunter et al. ............................ 239/728 |
| 4,263,029 | 4/1981 | George ...................................... 55/398 |
| 4,280,591 | 7/1981 | Newcomb . |
| 5,121,815 | 6/1992 | Francois et al. . |
| 5,341,900 | 8/1994 | Hikes ...................................... 184/6.12 |
| 5,862,997 | 1/1999 | Reinke .................................... 239/728 |

Primary Examiner—Andres Kashnikow
Assistant Examiner—Sean P. O'Hanlon
Attorney, Agent, or Firm—William M. Hobby, III

[57] ABSTRACT

A self-propelled irrigation apparatus has a plurality of spaced wheeled support towers supporting a linear water conduit having a plurality of sprinklers coupled thereto for irrigating an area of ground thereunder. At least one of the support towers has a drive motor attached thereto operatively coupled through a transmission gear box to at least one of the wheels for moving the support tower and water conduit over the ground. The transmission has a housing forming an oil reservoir therein. The improvement includes an auxiliary transmission oil reservoir attached to the frame of a support tower above the level of the transmission and having an oil line coupled to the transmission housing for maintaining replacement oil in the transmission housing under a positive pressure. The auxiliary oil reservoir is also connected through oil lines to each wheel gear box connection to each wheel. The auxiliary oil reservoir is transparent and includes a stand pipe outlet to separate condensate water from the oil in the auxiliary reservoir and a condensate drain for removal of accumulated water.

6 Claims, 1 Drawing Sheet

SELF-PROPELLED IRRIGATION SYSTEM

BACKGROUND OF THE INVENTION

The present invention relates to an auxiliary oil reservoir for self-propelled irrigation systems and especially to an auxiliary oil reservoir for the transmission gear box and wheel drive gear boxes of the irrigation system water conduit support towers.

Wheeled line irrigation systems are commonly used throughout the United States for irrigating agricultural lands. Generally, the wheeled line irrigation systems include a plurality of wheeled towers supporting a linear water conduit in a manner that the wheeled towers and water conduit can be moved through an agricultural field for changing the position of irrigation sprinklers coupled to the water conduit. One end of the water conduit is coupled to a water main or well and sprinkler heads are mounted in spaced alignment along the water conduit between the wheeled towers. The irrigation system may be moved in an agricultural field by a motor coupled through a gear box to the wheels of the towers.

One type of wheeled line irrigation system in common use is a center pivot irrigation system used in the irrigation of large fields. These typically comprise a linear water conduit which is pivotally connected at one end to a source of water under pressure. The water conduit is carried in an elevated position by a plurality of spaced wheeled towers which are powered by hydraulic, pneumatic or electric motors to rotatably sweep the central conduit over a central pattern in a field. The central conduit includes a plurality of water sprinkling heads spaced over its length for distributing a spray of water on the circular field area as the center pivot irrigation conduit passes thereby. The center pivot and other wheeled line irrigation systems have been successful for uniform distribution of water over a field crop.

In the typical wheeled line irrigation system, the wheels are powered by a hydraulic, pneumatic, or electrical motor which drive a transmission which includes reduction gears in a sealed casing or box which is typically filled with oil. The gear box has one or more rotary shafts extending therefrom to the wheels through wheel drive gears encased in a wheel gear housing which is also filled with oil and changes the rotary shaft direction of power to drive right angle wheel axles to rotate the wheels. This type of system has worked successfully throughout the United States but, in a typical system, the sealed transmission housing and wheel gear housing will sometimes loose the oil through the seals since the gear housings are working in an adverse environment below sprinklers and adjacent the earth. If the seal fails or the oil leaks out of the transmission or wheeled gear housing, then the gears will lack lubrication which results in increased friction, heat, and failure of the drive system.

The present invention is directed towards an auxiliary oil reservoir placed in a position above the transmission and wheeled gear housings to provide oil under pressure to all of the sealed oil containing housings. This allows the oil in a sealed housing to expand and contract through the oil lines to the auxiliary oil reservoir to avoid a positive or negative pressure within the transmission housing. The auxiliary oil reservoir is also formed with a transparent tube which allows a quick visual inspection of the oil level for all the gear housings simultaneously.

Prior art patents which include lubricators for irrigation systems or the like can be seen in the Newcomb U.S. Pat. No. 4,280,591, for a wheeled line chain lubricator which includes an oil reservoir for a partially submerged sprocket wheel. The sprocket wheel is loosely carried on a stationary axle mounted within the reservoir to permit both rotation and lateral slidable movement. The teeth of the sprocket then urges oil into the links and rollers of the drive chain as it is moved over the rotating sprocket. In the Allen, Jr. U.S. Pat. No. 3,762,643, an irrigating apparatus includes a water conduit supported above crop height on a self-propelled movable support tower which support towers have a motor and transmission means to drive a movable base. A rigid enclosure is provided for the transmission to hold a reservoir lubricant in contact with the transmission to prevent leaves, sand, dirt, and foliage from the crop from coming into contact with and fouling the transmission. In the Dooley et al. U.S. Pat. No. 3,463,267, an oil impregnating method and apparatus for a chain is provided while in the Francois et al. U.S. Pat. No. 5,121,815, an emergency lubricating device for a main gear box of a rotary wing aircraft for lubricating the rotary wing aircraft gear box.

In contrast, the present invention is for an auxiliary oil reservoir which is added to an existing water conduit support towers to help avoid the transmission and gear boxes from being damaged from the loss of oil through seals which may have been damaged from sand, dirt, and moisture from an agricultural field and prevents the build-up of undue pressure within a gear box when the oil in the gear box becomes heated.

SUMMARY OF THE INVENTION

A self-propelled irrigation system has a plurality of spaced wheeled support towers supporting a linear water conduit having a plurality of sprinkler heads coupled thereto for irrigating an area of ground thereunder. At least one of the support towers has a drive motor attached thereto operatively coupled through a transmission gear box to at least one of the wheels for moving the support tower and water conduit over the ground. The transmission has a housing forming an oil reservoir therein. An auxiliary transmission oil reservoir is attached to the frame of a support tower above the level of the transmission and has an oil line coupled to the transmission housing for maintaining replacement oil in the transmission housing under a positive pressure to allow the transmission oil to contract and expand in the housing to relieve pressure in the transmission. The auxiliary oil reservoir is also connected through oil lines to each wheel drive gear box connected to each wheel. The auxiliary oil reservoir is transparent and includes a stand pipe outlet to separate condensate water from the oil in the auxiliary reservoir and a condensate drain for the accumulated water.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
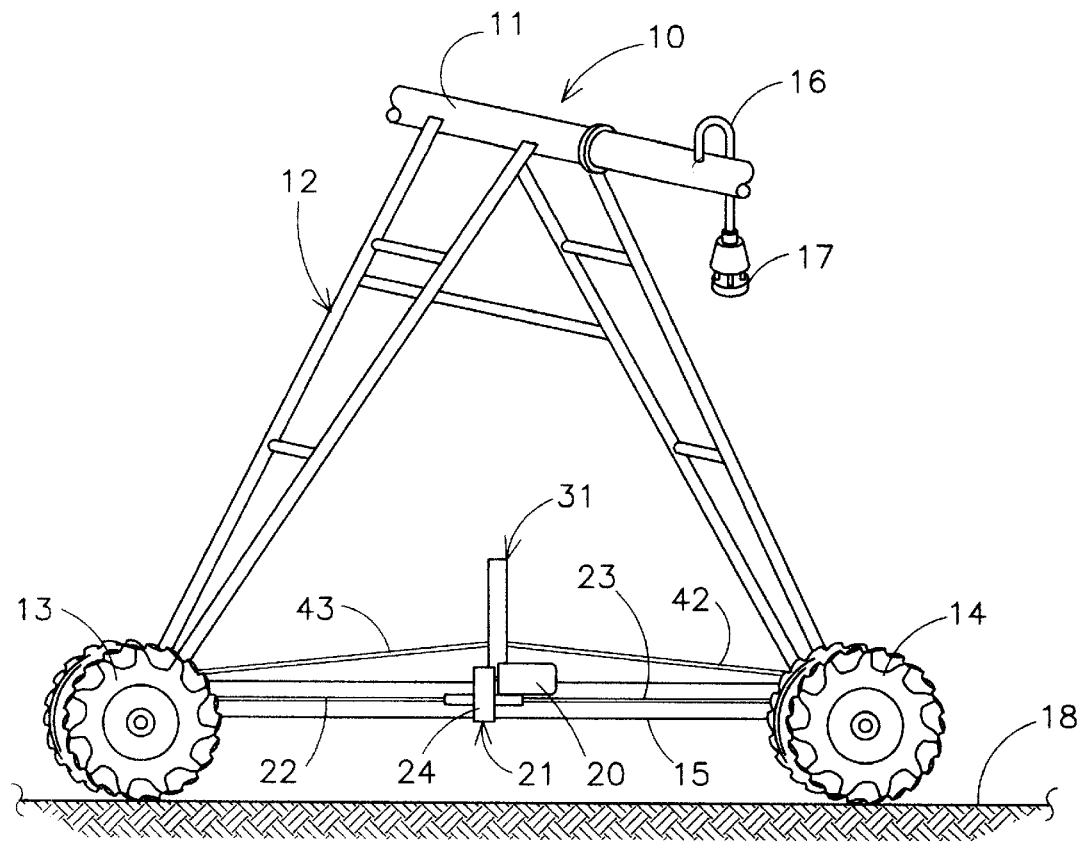
FIG. 1 is a perspective view of a section of an irrigation system having a water conduit supported on movable support towers.
Figure 2:
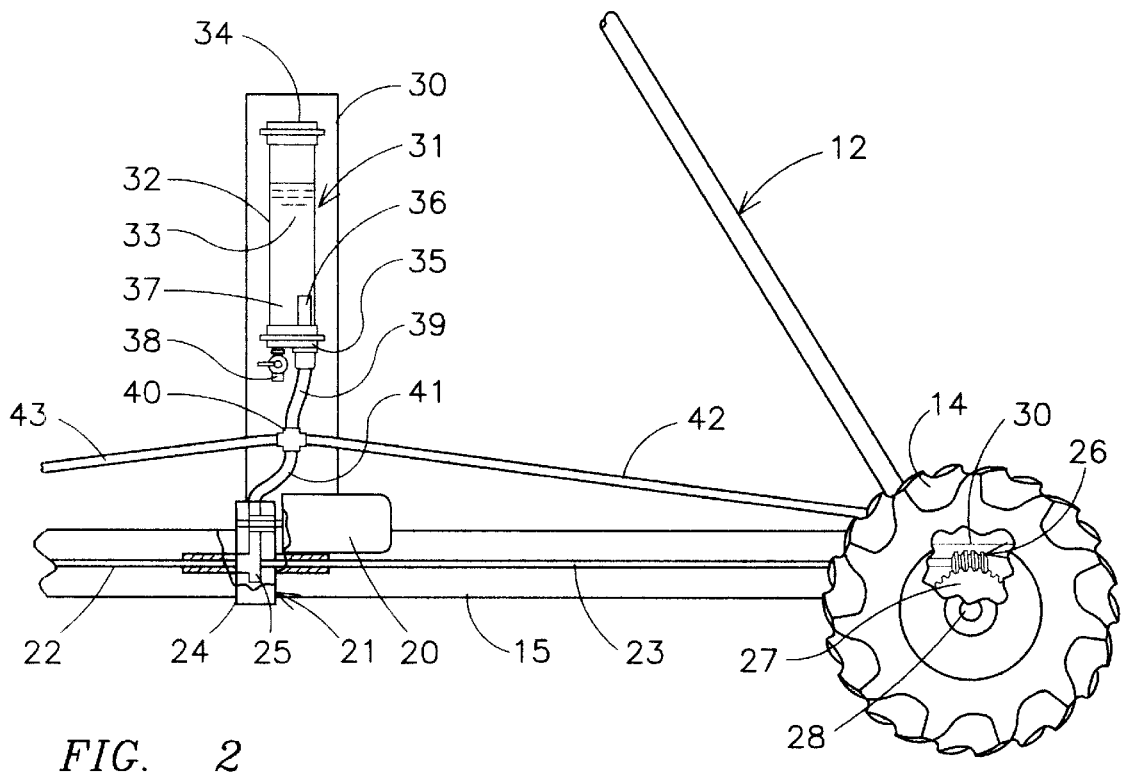
FIG. 2 is a cutaway elevation of the support tower of FIG. 1 having an auxiliary oil reservoir mounted in accordance with the present invention.

Referring to FIGS. 1 and 2 of the drawings, an irrigation system water conduit supporting tower 10 supports a water conduit 11. The support tower 10 has a framework 12 and wheels 13 and 14 rotatably attached to the frame 12 base frame member 15. The water conduit 11 is attached to a plurality of wheeled support towers 12 and spaced therebetween for a plurality of sprinkler pipes 16 typically connected to the top of the water conduit 11 and formed in a U-shape to extend below the conduit 11. A sprinkler head 17 is attached to the water pipe 16 and produces a spray in accordance with the sprinkler head to spray an agricultural field 18 that the tower 10 wheels 13 and 14 are riding upon. A tower 10 has a motor 20 which may be a hydraulic or electric motor mounted to the base frame member 15 and having its drive shaft connected directly to a transmission or reduction gear box 21, also supported on the frame member 15. The transmission 21 has a forward drive shaft 22 and a rear drive shaft 23 connected thereto through the transmission housing 24. The transmission housing 24 has reduction gears 25 therein and is filled with oil to keep the gears 25 lubricated. Transmission shafts 22 and 23 are each connected to a wheel gear box 26 adjacent the wheel 14, as shown in FIG. 2. The wheel gear housing has the gears 27 which convert the direction of power to right angles of the shaft 23 to rotate the wheel axle 28 to drive the wheel in a forward or reverse direction. A worm gear is used to change the direction of the drive shaft which uses screw threads keyed to the shaft to drive a spur gear or center gear drive.

In normal operation, the transmission 21 and the wheel gear boxes 26 are mounted in sealed housings 24 and 30 which are filled with an oil for constant lubrication of the gears mounted in the gear housings. However, if the seals for the shafts entering the gear housing fail or develop oil leaks, the entire gear system can be damaged. If one gear freezes up, the entire irrigation system can become inoperable.

A mounting bracket 30 is attached to the base frame member 15 and has an auxiliary oil reservoir 31 which has a transparent tube 32 filled with oil 33 which allows a quick visual check of the oil level. A removable cap 34 allows oil to be added to the tube 32 while a bottom 35 has an outlet standpipe 36 extending thereinto with an exit oil tube 39 extending therefrom. The standpipe 36 protrudes into the oil, as seen in FIG. 2, to allow the oil to pass into the pipe 36 while any condensate water will settle to the bottom area 37 below the entrance to the standpipe 36. A condensate drain 38 allows any water that may have accumulated in the bottom area 37 to be drained from the transparent tube 32. The oil line 39 is connected to a multiple line coupling 40 which in turn has an oil line 41 extending and attached to the transmission housing 24 of the transmission 21 while a pair of oil lines 42 and 43 extend from the coupling 40 to one of the wheel gear box housings 30. This allows a continuous open oil line from the auxiliary reservoir 31 to the transmission 21 and to each of the wheel gear boxes 30 so that oil under gravity pressure of the oil positioned on the support bracket 30 will always maintain the oil under pressure in each of the wheel gear boxes and transmission. If the oil in the gear boxes heats up from the operation of the gears and the atmospheric temperature, the expanding oil can be pushed back into the auxiliary reservoir 31. Similarly, the contraction of the oil from the cooling of the oil will allow the gear boxes to remain full. If any one of the gear boxes has a leaking seal, the oil will still be maintained within the gear box and the oil level in the auxiliary reservoir is readily noted through the transparent oil tube 32. In addition, water accumulation within the auxiliary reservoir 31 is readily noted in the bottom 37 and can be drained with the drain 38. The oil reservoir 31 is mounted on the bracket 30 at a height to provide a desired oil pressure within each of the gear boxes.

It should be clear at this time that an irrigation system of the type having a water conduit supported on self-propelled wheeled towers having a motor drive has been improved by the addition of an auxiliary oil reservoir supplying a plurality of sealed gear boxes to enhance the operation of the self-propelled wheeled towers. It should also be clear that the auxiliary oil tower can be easily and quickly attached to an existing irrigation system. However, the present invention should not be construed as limited to the forms shown which are to be considered illustrative rather than restrictive.

I claim:

1. A self-propelled irrigation system having a plurality of spaced wheeled support towers supporting a linear water conduit having a plurality of sprinkler heads coupled thereto for irrigating an area of ground thereunder and at least one of said support towers having a drive motor attached thereto operatively coupled through a transmission to at least one of said wheels for moving the support tower and water conduit over the ground and said transmission having a housing forming an oil reservoir therein, the improvement comprising:

an auxiliary oil reservoir having a top and a bottom and being attached to one said support tower above the level of said transmission and having an oil line coupled to said transmission housing for maintaining oil in said transmission housing under a positive pressure; whereby said transmission oil in said housing can remain full during contraction and expansion of said oil.

2. A self-propelled irrigation system in accordance with claim 1 in which said auxiliary oil reservoir includes a transparent oil container to thereby allow a visual inspection of the oil level therein.

3. A self-propelled irrigation system in accordance with claim 2 in which said auxiliary oil reservoir includes a standpipe outlet extending into said transparent oil container from said oil line to allow oil into said oil line above the bottom of said auxiliary oil reservoir to thereby separate water from said oil line.

4. A self-propelled irrigation system in accordance with claim 3 in which said auxiliary oil reservoir includes a condensate drain in the bottom thereof.

5. A self-propelled irrigation system in accordance with claim 1 in which said auxiliary oil reservoir is a transparent tube having a top and bottom and having a top entrance for adding oil thereto to thereby maintain the oil supply to said transmission.

6. A self-propelled irrigation system in accordance with claim 1 in which one said wheeled support tower has a plurality of wheels each having a wheel gear box connected thereto and each having a housing filled with oil and being connected with an oil line from said auxiliary oil reservoir.

* * * * *